United States Patent

Lauber et al.

Patent Number: 5,294,756
Date of Patent: Mar. 15, 1994

[54] CONVEYOR BELT SCALE APPARATUS

[75] Inventors: Jurgen Lauber, Karlsdorf; Eric Wainwright, Hausen, both of Fed. Rep. of Germany

[73] Assignee: Endress+Hauser Inc., Greenwood, Ind.

[21] Appl. No.: 878,836

[22] Filed: May 5, 1992

[51] Int. Cl.⁵ ............................ G01G 13/02; G01G 3/14
[52] U.S. Cl. ........................................... 177/119; 177/211
[58] Field of Search ................... 177/16, 119, 120, 121, 177/211, 145

[56] References Cited

U.S. PATENT DOCUMENTS

| | | | |
|---|---|---|---|
| 1,808,930 | 6/1931 | Messiter | 177/16 |
| 2,285,719 | 6/1942 | Jerome et al. | 177/16 |
| 2,311,614 | 2/1943 | Walter | 177/16 |
| 3,070,214 | 12/1962 | Del Rosso | 177/16 |
| 3,119,457 | 1/1964 | Thompson et al. | 177/16 |
| 3,133,605 | 5/1964 | Christmann | 177/16 |
| 3,180,475 | 4/1965 | Del Rosso | 177/16 |
| 3,299,975 | 1/1967 | Stambera et al. | 177/16 |
| 3,331,457 | 7/1967 | Blubaugh | 177/16 |
| 3,387,675 | 6/1968 | MacFarlane | 177/16 |
| 3,439,761 | 4/1969 | Laimins | 177/16 |
| 3,478,830 | 11/1969 | Levesque et al. | 177/16 |
| 3,513,921 | 5/1970 | Refer et al. | 177/16 |
| 3,559,451 | 2/1971 | Hyer et al. | 177/16 |
| 3,561,553 | 2/1971 | Blubaugh | 177/168 |
| 3,650,340 | 3/1972 | Bradley | 177/136 |
| 3,661,220 | 5/1972 | Harris | 177/211 X |
| 3,785,447 | 1/1974 | Blackerby | 177/119 |
| 3,863,725 | 2/1975 | Raynes | 177/52 |
| 3,924,729 | 12/1975 | Flinth et al. | 198/39 |
| 4,020,911 | 5/1977 | English et al. | 177/211 |
| 4,095,659 | 6/1978 | Blench et al. | 177/136 |
| 4,114,708 | 9/1978 | Saner | 177/145 |
| 4,128,001 | 12/1978 | Marks | 73/1 B |
| 4,157,661 | 6/1979 | Schindel | 73/228 |
| 4,249,623 | 2/1981 | McCauley | 177/136 |
| 4,260,034 | 4/1981 | Randolph, Jr. | 177/211 |
| 4,380,175 | 4/1983 | Griffen | 73/862.67 |
| 4,463,816 | 8/1984 | MacFarlane | 177/119 |
| 4,541,496 | 9/1985 | Layer | 177/211 |
| 4,557,341 | 12/1985 | Soederholm | 177/16 |
| 4,581,948 | 4/1986 | Reichow | 177/211 X |
| 4,682,664 | 7/1987 | Kemp | 177/16 |
| 4,788,930 | 12/1988 | Matteau et al. | 177/16 |

Primary Examiner—Benjamin R. Fuller
Assistant Examiner—Randy W. Gibson
Attorney, Agent, or Firm—Barnes & Thornburg

[57] ABSTRACT

A scale apparatus is provided for weighing material moving on a conveyor belt supported by an idler assembly. The apparatus includes a load cell support and a load cell having a base and a contact portion extending upwardly away from the base. The base of the load cell is configured to bend in response to a vertical force being applied to the contact portion to generate an output signal proportional to the force. The load cell is non-responsive to horizontal forces. The load cell is coupled to the load cell support, and the load cell support is coupled to a conveyor frame to suspend the load cell below the conveyor belt. The apparatus further includes an idler support for supporting the idler assembly. The idler support is coupled to the contact portion of the load cell. The idler support applies a downwardly directed force to the contact portion of the load cell to bend the base of the load cell in response to material moving on the conveyor belt over the idler support to change the output signal generated by the load cell in proportion to the weight of the material. The magnitude of the force applied by the idler support changes as the weight of the material moving over the idler support changes.

9 Claims, 5 Drawing Sheets

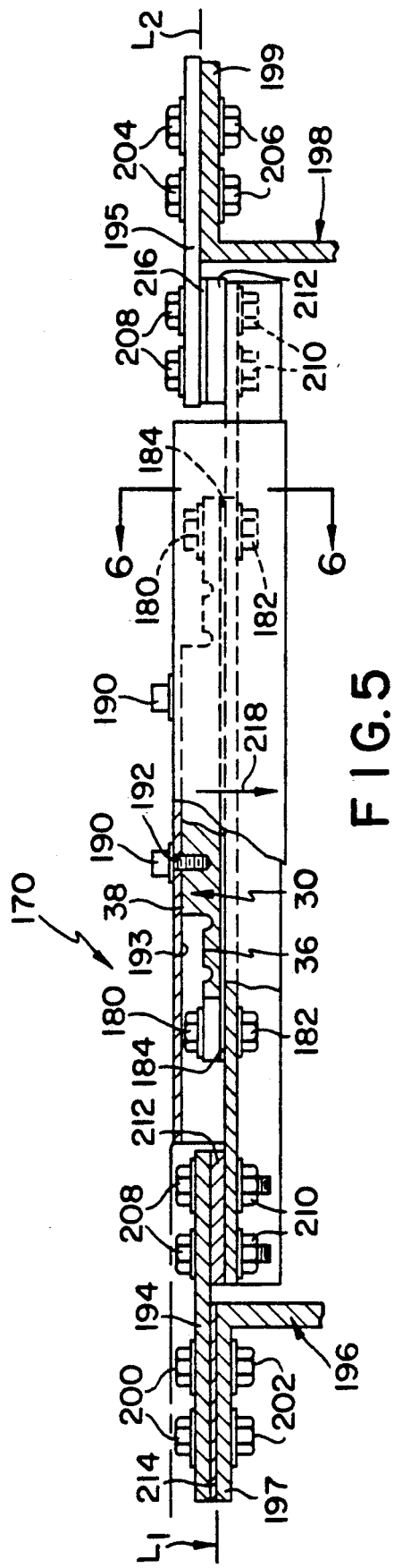
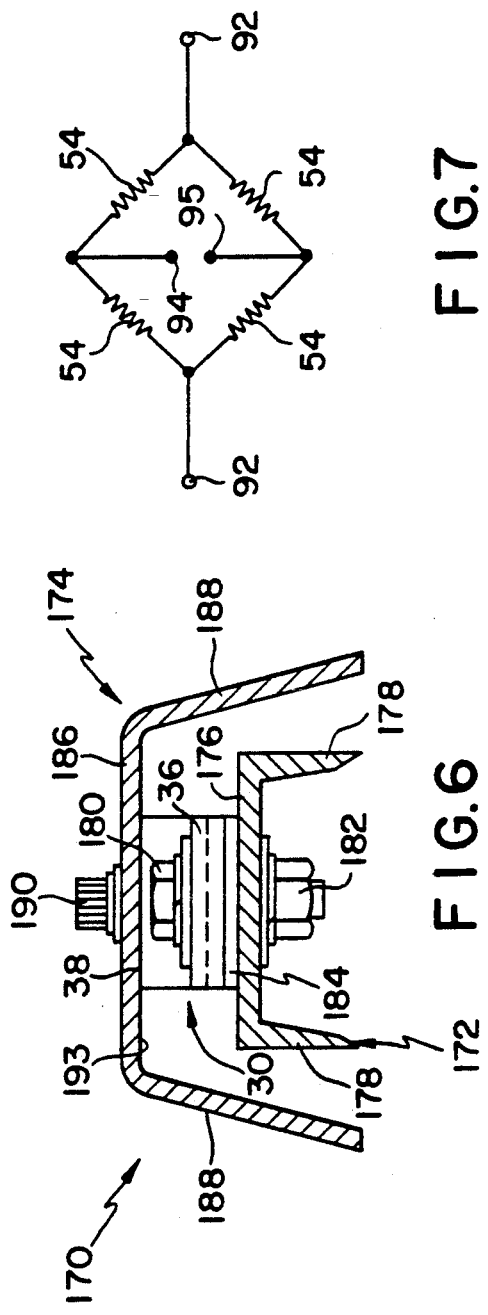
FIG. 5
FIG. 6
FIG. 7

CONVEYOR BELT SCALE APPARATUS

BACKGROUND AND SUMMARY OF THE INVENTION

The present invention relates to a scale apparatus for weighing materials moving on a conveyor belt. More particularly, the present invention relates to a scale apparatus that can be easily incorporated into existing conveyor systems.

It is often desirable to measure the mass flow rate of material moving on a conveyor belt. By combining the weight of the material and the speed of the conveyor belt, a continuous indication of the mass flow rate of the material moving on the conveyor belt can be generated. Various types of devices are known for measuring the weight of material moving on a conveyor belt.

It is known to provide load cells situated below a conveyor belt to generate an output signal proportional to the weight of a load moving across a conveyor belt. See, for example, U.S. Pat. Nos. 3,478,830; 3,439,761; 3,785,447; 3,924,729; 4,682,664; 4,788,930; 4,463,816; and 4,557,341. Conventional belt scales are often large, bulky devices which are expensive and often hard to install. Therefore, many conventional belt scale devices are too expensive for many businesses to purchase and install. Smaller businesses also have a need for reliable measurement of the weight or mass flow of material on a conveyor. For instance, concrete facilities and farming or grain handling facilities often need to know the amount of material moving on a conveyor. The present invention provides an accurate yet inexpensive scale apparatus that can be easily incorporated into existing belt conveyor systems.

According to the present invention, a scale apparatus is provided for weighing material moving on a conveyor belt supported by an idler assembly. The apparatus includes a load cell support and a load cell. The load cell includes a base and a contact portion extending upwardly away from the base. The base of the load cell is configured to bend in response to a vertical force being applied to the contact portion to generate an output signal proportional to the force. The load cell is non-responsive to horizontal forces. The belt scale apparatus also includes means for coupling the load cell to the load cell support and means for coupling the load cell support to a conveyor frame to suspend the load cell below the conveyor belt. The apparatus further includes an idler support for supporting the idler assembly and means for coupling the idler support to the contact portion of the load cell. The idler support applies a downwardly directed force to the contact portion of the load cell to bend the base of the load cell in response to material moving on the conveyor belt over the idler support to change the output signal generated by the load cell in proportion to the weight of the material. The magnitude of the force applied by the idler support changes as the weight of the material moving over the idler support changes.

In one embodiment of the invention, the load cell support is formed to include a central aperture therein for receiving the contact portion of the load cell therethrough. In another embodiment, the load cell support includes a top surface, and the means for coupling the load cell to the load cell support includes a first fastener for coupling a first end of the load cell to the top surface of the load cell support and a second fastener for coupling a second end of the load cell to the top surface of the load cell support. First and second shims are located between the load cell and the top surface of the load cell support adjacent the first and second ends of the load cell, respectively, to elevate the load cell above top surface of the load cell support to permit the base of the load cell to bend. The top surface of the load cell support is formed to include a recessed portion located below the load cell to permit further bending of the load cell.

According to another aspect of the invention, the idler support includes a top surface, a bottom surface, and an aperture extending between the top and bottom surfaces. A fastener extends through the aperture in the idler support for coupling the load cell to the bottom surface of the idler support. The bottom surface of the idler support is formed to include a recessed portion positioned over the contact portion of the load cell.

According to yet another aspect of the present invention, the base of the load cell is formed to include a plurality of notched sections therein to increase the flexibility of the base. The load cell includes a plurality of strain gauges. One strain gauge is located below each of the plurality of notched sections for generating the output signal in response to bending or deflection of the base.

According to still another aspect of the present invention, the belt scale apparatus further includes means for adjusting the level of the load cell support relative to the conveyor frame. The adjusting means preferably includes means for independently adjusting the level of a first end of the load cell support relative to a first side of the conveyor frame and a second end of the load cell support relative to a second side of the conveyor frame. In one embodiment, the means for coupling the load cell support to the conveyor frame includes a first coupler plate for coupling a first end of the load cell support to a first side of the conveyor frame and a second coupler plate for coupling a second end of the load cell support to a second side of the conveyor frame. The means for adjusting the level of the load cell support relative to the conveyor frame illustratively includes at least one shim configured to be selectively positioned between the first coupler plate and the first end of the load cell support, between the first coupler plate and the first side of the conveyor frame, between the second coupler plate and the second end of the load cell support, or between the second coupler plate and the second side of the conveyor frame. By selectively placing the shims, the position of the load cell idler station can be adjusted so that it is aligned with idler roller stations both upstream and downstream from the load cell idler station on the conveyor frame. The shims can be selectively placed either to raise or to lower the load cell support on either side of the attachment of the load cell support to the conveyor frame.

The belt scale apparatus of the present invention is easily installed into existing conveyor systems without substantial modification of the conveyor system. The present invention therefore advantageously provides an inexpensive yet accurate belt scale apparatus for weighing materials passing over the apparatus on a conveyor belt.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 5 is a side elevational view with portions broken away illustrating a third embodiment of the conveyor belt scale apparatus of the present invention including an assembly for adjusting the level of the load cell support relative to the conveyor frame;

FIG. 6 is a sectional view taken along lines 6—6 of FIG. 5; and

FIG. 7 is a diagrammatical electrical circuit diagram illustrating operation of the load cell of the present invention to generate the output signal.

DETAILED DESCRIPTION OF THE DRAWINGS

Figure 1:
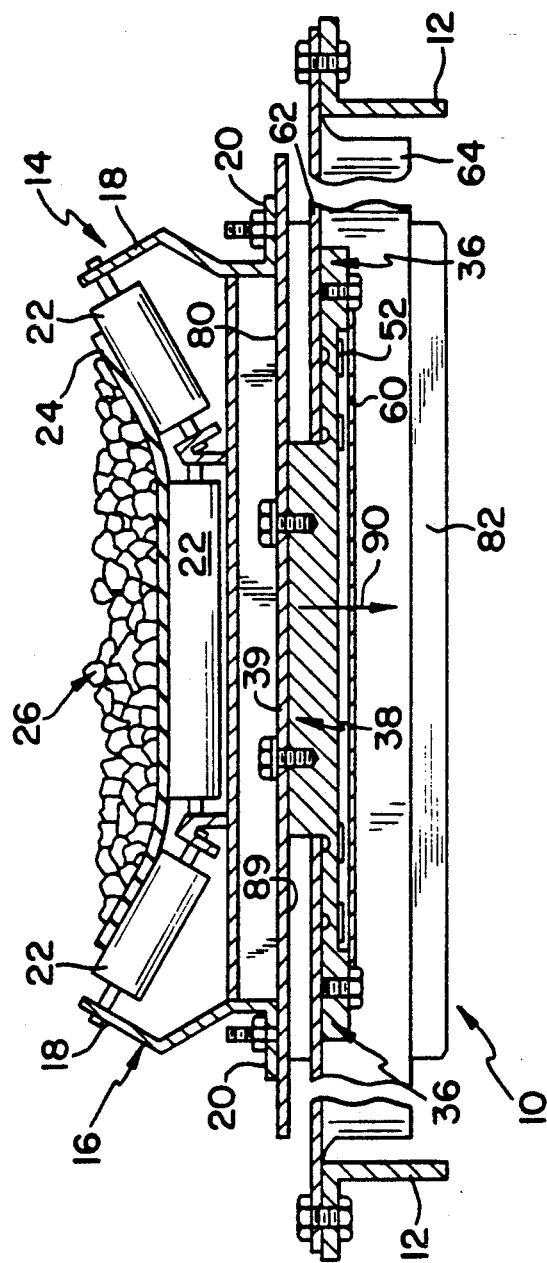
FIG. 1 is a sectional view taken through a conveyor belt scale apparatus of the present invention illustrating a load moving along a conveyor belt above a roller assembly which causes the conveyor belt scale apparatus to generate an output signal proportional to the weight of the load on the conveyor belt.

Referring now to the drawings, FIG. 1 illustrates the conveyor belt scale apparatus 10 of the present invention. Belt scale apparatus 10 is situated between opposite sides of conveyor frame 12. An idler roller assembly 14 is coupled to belt scale apparatus 10. Illustratively, idler roller assembly 14 includes a frame 16 having end brackets 18, a generally flat base portion 20, and three idler rollers 22. Idler rollers 22 support a conveyor belt 24 for transporting a load or material 26 in a conventional manner. It is understood that other types of conveyor systems and idler roller assemblies may be used in accordance with the present invention.

Figure 3:
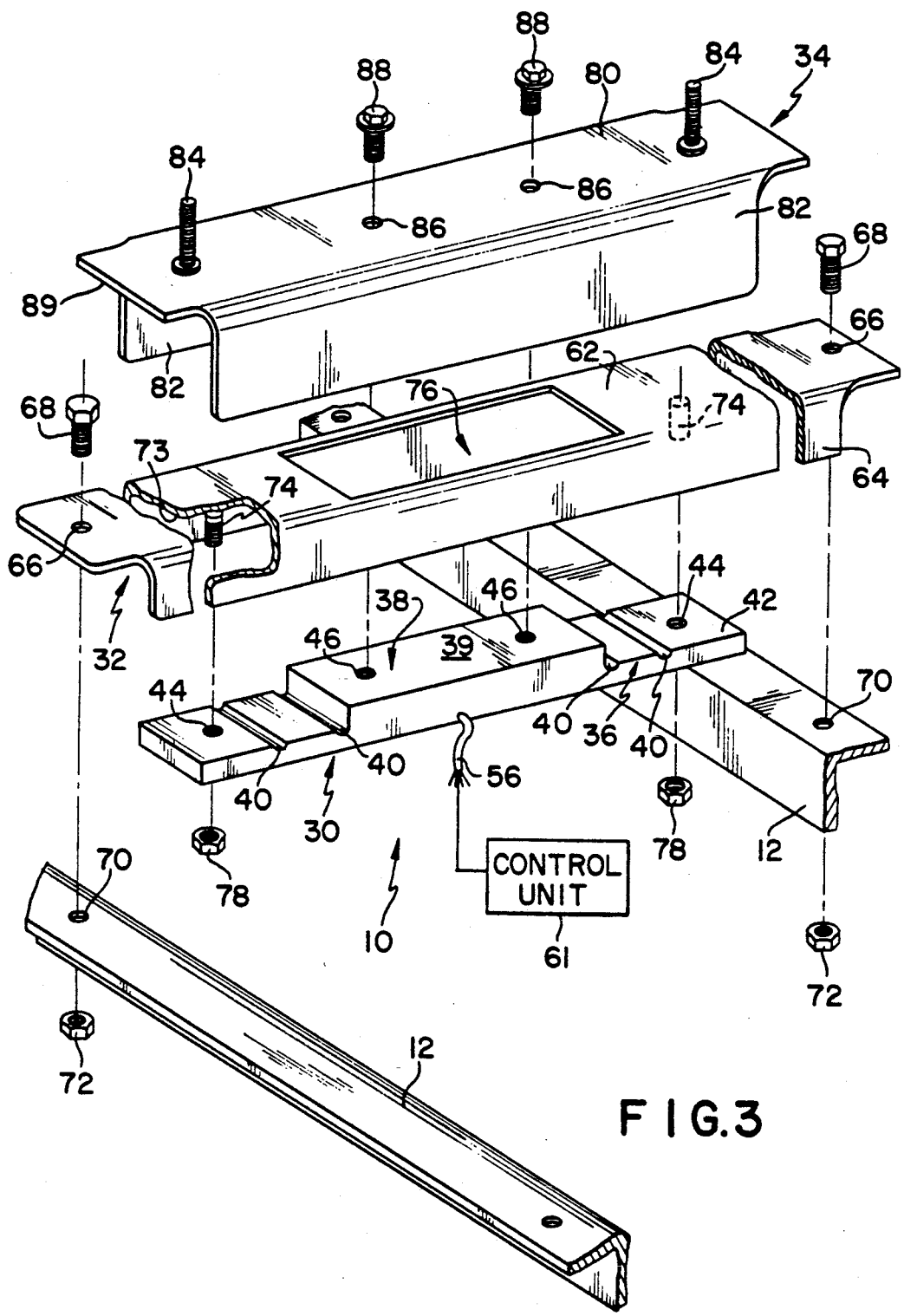
FIG. 3 is an exploded perspective view of the belt scale apparatus illustrated in FIG. 1, further illustrating the load cell, a load cell support, and an idler support.

The configuration of the belt scale apparatus 10 is best illustrated in FIG. 3. Belt scale apparatus 10 includes a load cell 30, a load cell support 32, and an idler support 34. Load cell 30 includes a generally rectangular body portion or base 36 and an elevated central contact portion 38 extending upwardly from base 36. Contact portion 38 includes a top contact surface 39. Four cut-outs or notched sections 40 are formed in a top surface 42 of base 36. Apertures 44 are formed at opposite ends of load cell 30. Threaded apertures 46 are formed in contact portion 38 of load cell 30.

Figure 2:
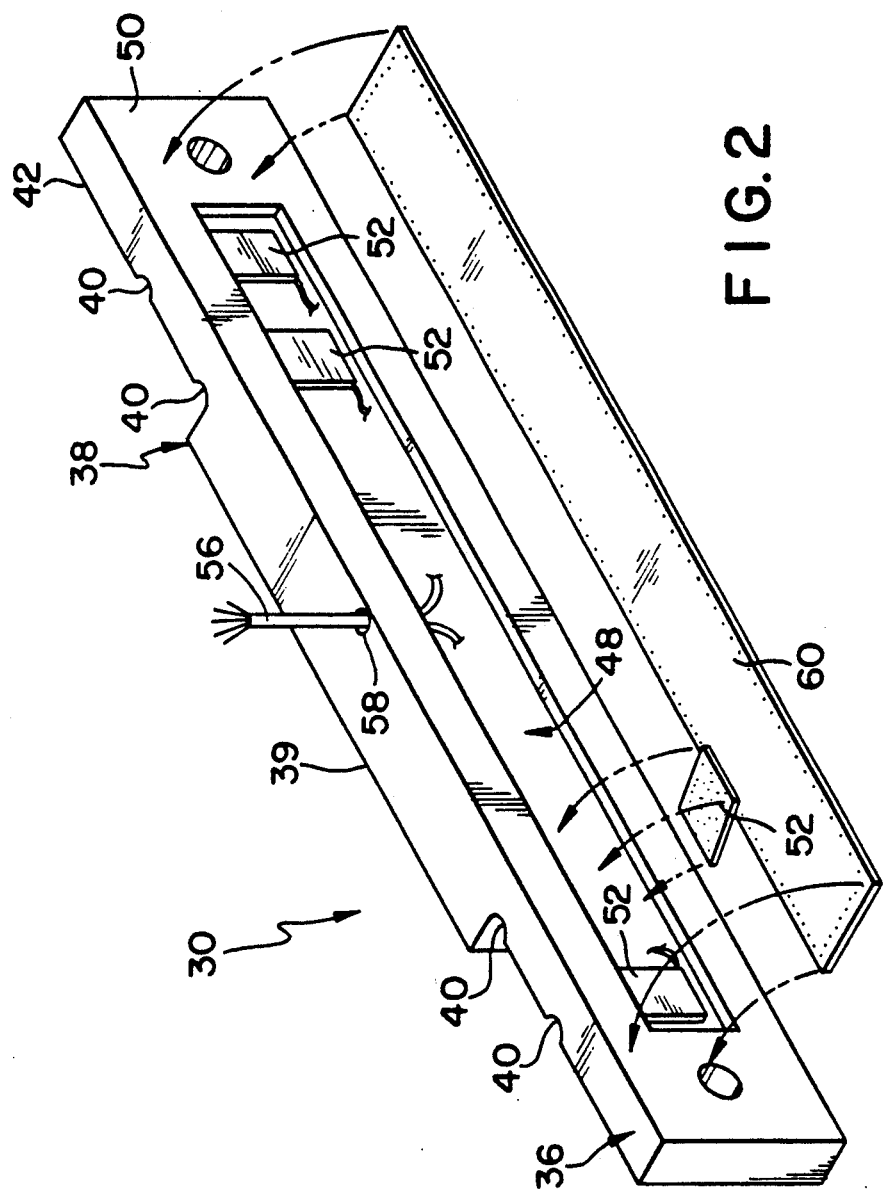
FIG. 2 is a perspective view of a load cell of the present invention illustrating the configuration of strain gauges mounted within the load cell for generating the output signal.

As illustrated in FIG. 2, load cell 30 also includes a recessed section 48 formed in a bottom surface 50 of base 36. Four strain gauges 52 are secured to the load cell 30 inside recessed section 48. Each strain gauge 52 is located below a notched section 40 formed in top surface 42 of base 36. Strain gauges 52 are electrically coupled together to form a bridge circuit arrangement as illustrated diagrammatically in FIG. 7. In FIG. 7, variable resistors 54 represent strain gauges 52 in load cell 30. As discussed in detail below, strain gauges 52 provide an output signal on wire 56 which extends through an aperture 58 formed in load cell 30. A cover plate 60 is secured to bottom surface 50 of load cell 30 after strain gauges 52 are secured in the proper position inside recessed section 48 of load cell 30. Load cell 30 is coupled to control unit 61 (FIG. 3) which processes the output signal from wire 56 in a conventional manner. A mass flow rate of the material 26 (FIG. 1) can be determined by multiplying the weight of material indicated by the load cell 30 output signal by the velocity of the conveyor belt 24 which can be input to control unit 61 from a conventional velocity sensor (not shown).

The size and depth of notched sections 40 varies depending on the desired flexibility of the base 36 and the amount of range desired. For instance, if relatively light weight material is to be weighed, notched sections 40 would be cut deeper to provide more flexibility. If relatively heavy material is to be weighed, notched sections 40 are cut less deep. Preferably load cell 30 is an LO-10 double-ended beam type load cell available from Lorenz Messtechnik GmbH in Alfdorf, Germany.

Referring again to FIG. 3, load cell support 32 includes a top surface 62 and side flanges 64. Top surface 62 is formed to include apertures 66 at opposite ends of load cell support 32. A suitable fastener such as bolt 68 is inserted through aperture 66 and through an aperture 70 formed in conveyor frame 12 to secure load cell support 32 to conveyor frame 12. A nut 72 is fastened on bolts 68. Load cell support 32 includes threaded studs 74 which are welded to a bottom surface 73 of load cell support 32. Studs 74 are spaced apart a distance equal the spacing of apertures 44 formed in load cell 30. Load cell support 32 is also formed to include an aperture 76 for receiving the contact portion 38 of load cell 30 therethrough. Studs 74 are inserted through apertures 44 of the load cell 30. Nuts 78 are then threaded onto studs 74 to secure load cell 30 to load cell support 32. As best illustrated in FIG. 1, contact portion 38 extends through aperture 76 to lie above top surface 62 of load cell support 32. Therefore, opposite ends of base 36 are secured to the load cell support 32. A middle portion of base 36 below contact portion 38 is free to move. Therefore, a force applied to contact portion 38 causes base 36 to bend or deflect downwardly.

Idler support 34 includes a top surface 80 and side flanges 82. Threaded studs 84 are welded to top surface 82 of idler support 34. Threaded studs 84 are used to couple idler roller assembly 14 to idler support 34 as illustrated in FIG. 1. Idler support 34 is also formed to include apertures 86 which are spaced apart the same distance as apertures 46 in contact portion 38 of load cell 30. Threaded fasteners 88 extend through apertures 86 and into threaded apertures 46 of load cell 30 to couple idler support 34 to load cell 30. A bottom surface 89 of idler support 34 abuts contact surface 39 of contact portion 38 of load cell 30.

As illustrated in FIG. 1, movement of material 26 over idler roller assembly 14 on conveyor 24 creates a downwardly-directed force in the direction of arrow 90 on idler support 34. Because bottom surface 89 of idler support 34 only abuts contact surface 39 of load cell 30 the downwardly-directed force in the direction of arrow 90 on idler support 34 is transferred directly to contact portion 38 of load cell 30. This causes deflection or bending of the base 36 of load cell 30 in the direction of arrow 90 as the material 26 moves over idler roller assembly 14.

Strain gauges 52 provide a variable resistance depending upon the amount of deflection or bending which occurs in base 36 of load cell 30. Strain gauges 52 are electrically coupled into a bridge circuit such as illustrated in FIG. 7. A voltage is applied across terminals 92. When no weight is applied to contact portion 38 of load cell 30, the bridge is balanced to give zero output at terminals 94 and 95. If weight from material 26 is applied to contact portion 38 of load cell 30, base 36 of load cell 30 is deflected to bend strain gauges 52. This causes the resistance of each strain gauge 52 to change. Therefore, the bridge becomes unbalanced and an output voltage signal which is substantially proportional to the applied weight to load cell 30 appears across terminals 94 and 95. This output signal is transmitted over wire 56 to control unit 61 as discussed above.

Figure 4:
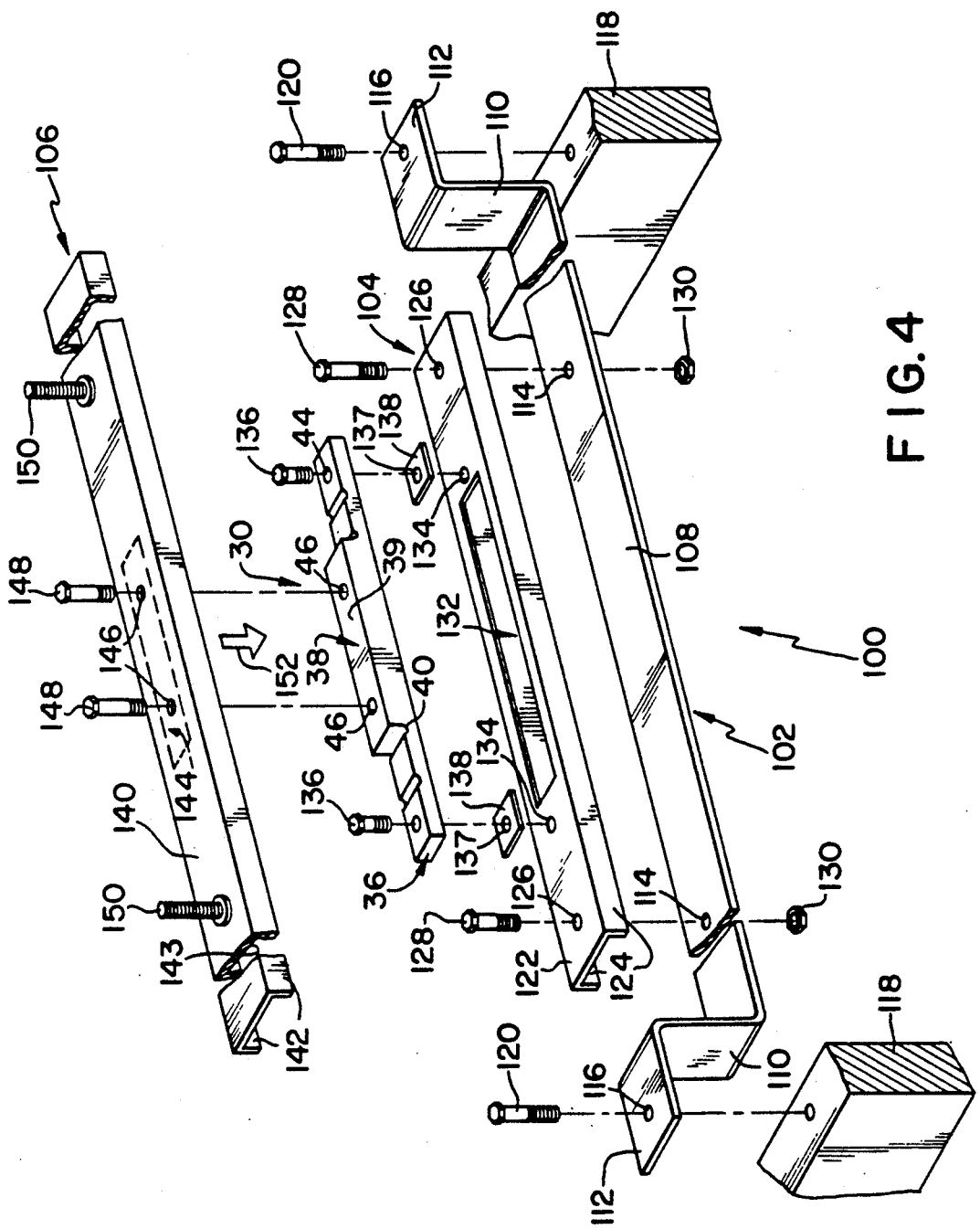
FIG. 4 is an exploded perspective view of a second embodiment of the conveyor belt scale apparatus of the present invention.

A second embodiment of the present invention is illustrated in FIG. 4. In this embodiment, the belt scale apparatus 100 includes a belt scale support 102, a load cell support 104, load cell 30 and an idler support 106. Belt scale support 102 includes a base section 108, upwardly extending sides 110 and flanges 112 located at opposite ends of belt scale support 102. Flanges 112 are generally parallel to base section 108. Base section 108 is formed to include apertures 114 therein for securing load cell support 104 to belt scale support 102. Each of the flanges 112 is also formed to include an aperture 116 for securing belt scale support 102 to the conveyor frame 118 with suitable fasteners 120. Belt scale support 102 is configured to align idler support 106 with a top surface of conveyor frame 118.

Load cell support 104 includes a top 122 and side flanges 124. Load cell support 104 also includes a first pair of apertures 126 extending through top 122. Fasteners such as bolts 128 extends through apertures 126 in load cell support 104 and through apertures 114 in belt scale support 102. Nuts 130 are then threaded onto bolts 128 to secure load cell support 104 to belt scale support 102. A counter sink or recessed portion 132 is formed on top 122 of load cell support 104. Recessed portion 132 does not extend completely through top 122. Load cell support 104 is formed to include a second pair of apertures 134 which extend through top 122.

Load cell 30 used in the second embodiment illustrated in FIG. 4 is the same load cell 30 used in the first embodiment illustrated in FIGS. 1–3. Fasteners 136 extend through apertures 44 in load cell 30, through an aperture 137 in a shim 138, and through aperture 134 in load cell support 104. Nuts are then threaded onto bolts 136 to secure load cell 30 to load cell support 104. Shims 138 elevate bottom surfaces 50 of load cell 30 above top 122 of load cell support 104 to permit deflection of load cell 30 when a force is applied to contact surface 39. Recessed section 132 permits further deflection of base 36 of load cell 30. Shims 138 are made from a material which is insensitive to temperature changes and does not expand or contract substantially over a wide range of temperatures. Therefore, the position of load cell 30 relative to load cell support 104 does not change substantially as the temperature changes. Accordingly, the position of idler support 106 remains substantially level with upstream and downstream idler stations despite temperature fluctuations.

Idler support 106 includes a top surface 140 and side flanges 142. A bottom surface 143 of idler support 106 is formed to include a counter sink or recessed section 144 as illustrated by dotted lines in FIG. 4. Recessed section 144 is designed to receive contact surface 39 of load cell 30 therein to position load cell 30 relative to idler support 106. Top surface 140 of idler support 106 is formed to include a pair of apertures 146 spaced apart by a distance equal to the distance by separation of apertures 46 in contact portion 38 of load cell 30. Threaded fasteners 148 extend through apertures 146 in idler support 106 and into threaded apertures 46 of load cell 30 to secure idler support 106 to load cell 30. Therefore, bottom surface 143 abuts contact surface 39 of load cell 30.

An idler roller assembly such as idler roller assembly 14 in FIG. 1 is coupled to idler support 106 by threaded studs 150 welded to top surface 140 of idler support 106. As material 26 on a conveyor belt passes over idler support 106, idler support 106 applies a downwardly directed force on contact portion 38 in the direction of arrow 152 in FIG. 4. Because idler support 106 rests only upon contact surface 39 of load cell 30, base 36 of load cell 30 is deflected by the weight of the material passing on the conveyor belt and the idler roller assembly located above idler support 106. Such deflection of load cell 30 causes strain gauges 52 to provide an output signal proportional to the weight of the material passing over belt scale apparatus 100 in a manner discussed above in reference to FIGS. 1–3.

A third embodiment of the present invention is illustrated in FIGS. 5 and 6. The belt scale apparatus 170 includes a load cell support 172, a load cell 30 identical to the load cell illustrated in FIGS. 1–4, and an idler support 174. Load cell support 172 includes a top 176 and side flanges 178 extending downwardly from top 176. Load cell 30 is coupled to top 176 of load cell support 172 by bolts 180 and nuts 182. A shim 184 is located between load cell 30 and top 176 of load cell support 172 at each end of load cell 30 so that the bottom surface 50 of load cell 30 is spaced apart from top 176 of load cell support 172. This permits deflection or bending of load cell 30. Shims 184 are made from a material that is insensitive to temperature changes and does not expand or contract substantially over a wide range of temperatures. Therefore, the position of load cell 30 relative to load cell support 172 does not change substantially as the temperature changes. Accordingly, the position of idler support 174 remains substantially level with upstream and downstream idler stations despite temperature fluctuations.

Idler support 174 includes a top 186 and downwardly extending side flanges 188. Threaded fasteners 190 extend through apertures 192 formed in top 186 and into threaded apertures 46 of load cell 30 to couple idler support 176 to load cell 30. Therefore, a bottom surface 193 of idler support 174 abuts contact surface 39 of load cell 30.

Coupler plates 194 and 195 are provided to couple belt scale apparatus 170 to first and second sides 196 and 198 of a conveyor frame. Belt scale apparatus 170 is especially useful in situations in which first side 196 of conveyor frame is positioned at a level different from second side 198 of conveyor frame. In FIG. 5, horizontal flange 197 of first side 196 is located at a first level illustrated by L1 and horizontal flange 199 of second side 198 of conveyor frame is situated at a second level illustrated by level L2. Coupler plate 194 is coupled to horizontal flange 197 by bolts 200 and nuts 202. Coupler plate 195 is coupled to horizontal flange 199 by bolts 204 and nuts 206. Coupler plates 194 and 195 are coupled to opposite ends of load cell support 172 by bolts 208 and nuts 210. A spacer plate 212 is situated between coupler plates 194 and 195 and top 176 of load cell support 72 at each end of load cell support 172.

It is desirable that the load cell idler station is aligned with idler assemblies or stations both upstream and downstream from the load cell idler station on conveyor frame. An unlevel load cell idler station can cause load cell 30 to generate inaccurate output signals. Belt scale apparatus 170 includes six shim areas which permit the level of load cell 30 to be adjusted. Shim areas are located between coupler plate 194 and horizontal flange 197 of first side 196 of the conveyor frame, between spacer plate 212 and coupler plates 194 and 195 at each end of load cell support 172, between top surface 176 and spacer plate 212 at each end of load cell support 172, and between coupler plate 195 and horizontal flange 199 of second side 198 of the conveyor frame. A shim can be placed in any of these six shim areas to adjust the position of load cell support 172 and load cell 30 relative to the conveyor frame. In the FIG. 5 illustration, horizontal flange 197 is located at a first level L1 which is lower than the level L2 of second horizontal flange 199. Therefore, a shim 214 is positioned between coupler plate 194 and horizontal flange 197 to elevate the position of coupler plate 194 and the end of load cell support 172 adjacent first side 196 of the conveyor frame. In addition, a shim 216 is positioned between coupler plate 195 and spacer plate 212 adjacent second side 198 of the conveyor frame. This lowers the end of load cell support 172 adjacent second side 198 of the conveyor frame. By adding shims 214 and 216, contact surface 39 of load cell 30 is substantially level, despite the different levels of horizontal flanges 197 and 199. If necessary, an additional shim (not shown) can be added between spacer plate 212 and top 176 of load cell support 172 adjacent second side 198 to lower the end of load cell support 172 adjacent second side 198 further.

If first horizontal flange 197 is at a higher level than second horizontal flange 199, a shim would be added between coupler plate 195 and horizontal flange 199 to raise the level of load cell support 172 adjacent second end 198. In addition, shims could be added between coupler plate 194 and spacer plate 212 and between spacer plate 212 and top 176 of load cell support 172 adjacent first side 196. This would lower the end of load cell support 172 adjacent first side 196 of the conveyor frame to level contact surface 38 of load cell 30.

An idler roller assembly such as assembly 14 illustrated in FIG. 1 is coupled to idler support 174 by threaded studs (not shown) welded to top 186 of idler support 174. When material moves on a conveyor belt over idler roller assembly, idler support 174 applies a force in the direction of arrow 218 on load cell 30. Because load cell 30 is spaced apart from top 176 of load cell support 172 by shims 184, the force in the direction of arrow 218 causes deflection of base 36 of load cell 30. This deflection causes the resistance of strain gauges 52 to change which, in turn, causes an output signal from load cell 30 to change in proportion to the weight of the material passing over the idler roller assembly above idler support 174 as discussed in detail with reference to FIGS. 1-3.

It is understood that the various components of the three illustrated embodiments may be interchanged if desired. For example, the adjustment coupling apparatus illustrated in FIG. 5 could be used in either of the first two embodiments.

Although the invention has been described in detail with reference to certain preferred embodiments, variations and modifications exist within the scope and spirit of the invention as described and defined in the following claims.

What is claimed is:

1. A scale apparatus for weighing material moving on a conveyor belt supported by an idler assembly, the apparatus comprising:
   a load cell support formed to include an aperture therein;
   a load cell including a base and a contact portion extending upwardly away from the base, the base of the load cell being configured to bend in response to a force being applied to the contact portion to generate an output signal proportional to the force;
   means for coupling the load cell to the load cell support so the contact portion of the load cell extends upwardly through the aperture formed in the load cell support;
   means for coupling the load cell support to a conveyor frame to suspend the load cell below the conveyor belt;
   an idler support for supporting the idler assembly; and
   means for coupling the idler support to the contact portion of the load cell, the idler support applying a downwardly directed force to the contact portion of the load cell to bend the base of the load cell in response to material moving on the conveyor belt over the idler support to change the output signal generated by the load cell in proportion to the weight of the material.

2. The apparatus of claim 1, wherein the idler support includes a top surface, a bottom surface, and an aperture extending between the top surface and bottom surface, and further comprising a fastener extending through the aperture in the idler support for coupling the load cell to the bottom surface of the idler support.

3. The apparatus of claim 2, wherein the bottom surface of the idler support is formed to include a recessed portion positioned over the contact portion of the load cell.

4. The apparatus of claim 1, wherein the base of the load cell is formed to include a plurality of notched sections therein to increase flexibility of the base.

5. The apparatus of claim 4, wherein the load cell includes a plurality of strain gauges, one strain gauge being located below each of the plurality of notched sections for generating the output signal in response to bending of the base.

6. The apparatus of claim 1, wherein the means for coupling the load cell support to the conveyor frame includes means for adjusting a level of the load cell support relative to the conveyor frame.

7. The apparatus of claim 6, wherein the adjusting means includes means for independently adjusting a level of a first end of the load cell support relative to a first side of the conveyor frame and a second end of the load cell support relative to a second side of the conveyor frame.

8. The apparatus of claim 6, wherein the means for coupling the load cell support to the conveyor frame includes a first coupler plate for coupling a first end of the load cell support to a first side of the conveyor frame and a second coupler plate for coupling a second end of the load cell support to a second side of the conveyor frame.

9. The apparatus of claim 8, wherein the means for adjusting the level of the load cell support relative to the conveyor frame includes at least one shim configured to be selectively positioned between at least one of the first coupler plate and the first end of the load cell support, the first coupler plate and the first side of the conveyor frame, the second coupler plate and the second end of the load cell support, and the second coupler plate and the second side of the conveyor frame.

* * * * *